（12) United States Patent
Oike et al.

(10) Patent No.: US 6,449,383 B1
(45) Date of Patent: Sep. 10, 2002

(54) LANE MARK RECOGNITION SYSTEM AND VEHICLE TRAVELING CONTROL SYSTEM USING THE SAME

(75) Inventors: Tatsuya Oike, Okazaki; Kutsuhiko Hibino, Anjo; Masayuki Imanishi, Okazaki, all of (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 09/237,686

(22) Filed: Jan. 27, 1999

(30) Foreign Application Priority Data

Jan. 27, 1998 (JP) .......................................... 10-014233

(51) Int. Cl.7 ................................................. G06K 9/00
(52) U.S. Cl. ......................... 382/104; 340/907; 340/933
(58) Field of Search ................................. 382/104, 103, 382/199; 701/23, 28, 42, 207; 340/941, 901, 439, 907, 933; 73/146; 180/421, 168; 348/149, 113

(56) References Cited

U.S. PATENT DOCUMENTS

| 4,868,403 | A | * | 9/1989 | Takahashi et al. | ........... 250/563 |
|---|---|---|---|---|---|
| 4,909,073 | A | * | 3/1990 | Takahashi et al. | ............. 73/146 |
| 5,351,044 | A | * | 9/1994 | Mathur et al. | ............... 340/901 |
| 5,642,093 | A | * | 6/1997 | Kinoshita et al. | ........... 340/439 |
| 5,708,427 | A | * | 1/1998 | Bush | .......................... 340/941 |
| 5,826,677 | A | * | 10/1998 | Nishizaki et al. | ........... 180/421 |
| 5,847,755 | A | * | 12/1998 | Wixson et al. | ............... 348/149 |
| 5,904,725 | A | * | 5/1999 | Iisaka et al. | ................. 701/207 |
| 5,913,375 | A | * | 6/1999 | Nishikawa | .................. 180/168 |
| 5,987,174 | A | * | 11/1999 | Nakamura et al. | ........... 382/199 |
| 6,053,270 | A | * | 4/2000 | Nishikawa et al. | ......... 180/168 |

FOREIGN PATENT DOCUMENTS

| JP | 4-137014 | 5/1992 | ............ G05D/1/02 |
|---|---|---|---|
| JP | 5-46242 | 2/1993 | ............ G05D/1/02 |
| JP | 5-289743 | 11/1993 | ............ G05D/1/02 |
| JP | 6-215292 | 8/1994 | ............ G05D/1/02 |
| JP | 7-239996 | 9/1995 | ............ G05D/1/02 |
| JP | 9-73545 | 3/1997 | ............ G05D/1/02 |

OTHER PUBLICATIONS

Kass, Witkin and Terzopoulos; Snakes: Active Contour Models;International Journal of Computer Vision, 1998; pp. 321–331.

* cited by examiner

Primary Examiner—Leo Boudreau
Assistant Examiner—M. Barry Choobin
(74) Attorney, Agent, or Firm—Harness, Dickey & Pierce, PLC (57) ABSTRACT

A lane mark recognition apparatus for a vehicle is provided which recognizes a lane mark printed on a road using an image of a frontal view captured by a CCD camera. The apparatus identifies a location in the image on which a string model construct converges as a location of the lane mark. The string model utilizes a string construct that is made up of a plurality of node-type string components and lines connecting adjacent string components. The string components are movable within the image by an attractive force produced based on a measure of a picture property of the lane mark. Each of the connecting lines is modeled as an elastic member, which produces a reactive force against deformation of the string model so as to maintain geometry of the whole of the string model.

12 Claims, 4 Drawing Sheets

LANE MARK RECOGNITION SYSTEM AND VEHICLE TRAVELING CONTROL SYSTEM USING THE SAME

BACKGROUND OF THE INVENTION

1. Technical Field of the Invention

The present invention relates generally to a lane mark recognition apparatus for vehicles which is designed to recognize a lane mark printed on a road surface accurately using an image of a frontal view captured by a camera.

2. Background Art

In recent years, automotive lane mark recognition techniques are being developed which recognize white or yellow lane marks printed on a traffic lane using a captured image of a view in front of a vehicle for realizing automatic cruise control of the vehicle. For instance, Japanese Patent First Publication No. 5-289743 teaches binary-coding of a captured image to recognize a lane mark. Japanese Patent First Publication No. 7-239996 teaches processing edges of a captured image before binary-coding of the image. Japanese Patent First Publication No. 6-215292 proposes the use of Hough transform in image processing.

The above prior art systems, however, encounter drawbacks in respect to two points below.

The first relates to a problem in binary coding. A system, as taught in the above publication No. 5-289743 or No. 7-239996, which binary codes an original image or an edge-processed image may erase useful lane mark data or edge data of a lane mark through the binary coding, especially when the image has a low contrast and is unstable, sensitive to a change in environmental condition. Once erased, the data is difficult to recover. A system, as taught in the publication No. 6-215292, using Hough transform requires binary coding of an image and is also sensitive to a change in environmental condition. Usually, Hough transform requires a large number of calculations, which give rise to problems of a processing time and size of hardware. A practical Hough transform technique can only detect a straight line. There is another Hough transform technique capable of detecting curves, but it is unpractical in respect to the quantity of computation. The use of Hough transform in recognizing a lane mark, therefore, requires any additional technique for detecting curved portions of an image of the lane mark.

The second point relates to a problem in dot-to-line image processing. It is necessary for identifying a lane mark in a captured image to trace candidate edges for the lane mark extracted by binary coding the image to define a line. If, however, another edge exists near the lane mark image, it will result in tracing candidate edges. For example, when it is required to identify a white line printed on a road, and when a white car is traveling on the road, the car may form an edge near the white line image, thereby resulting in failure in tracing candidate edges for the line.

Specifically, the prior art systems have the disadvantage that they are influenced adversely by variation in environmental conditions. Lane mark recognition systems that do not require the binary coding and the dot-to-line image processing are sought.

As one of such systems, a contour recognition system called "Snakes" (see "Snakes: Active Contour Models," International Journal of Computer Vision, pp. 321–331 (1988)) is known. The Snake system works to move contour points of the snake, mathematically represented as v(s)=(x(s), y(s)), to positions of minimum energy within an image.

The energy function of a snake system may be represented as:

$$Esnakes(v) = \int [Eint(v(s)) + Eimage(v(s)) + Econ(v(s))]ds$$

Eint(v(s)) is an internal spline energy of the Snakes which is defined by $Eint(v(s))=(\alpha(s)|Vs(s)|^2+\beta(s)|Vss(s)|^2)$ where $Vs=dv/ds$, $Vss=dv^2/ds^2$, $\alpha(s)$ is a parameter representing expansion/contraction such as a property of a rubber film, and $\beta(s)$ is a parameter representing the degree of smoothness of a closed curve.

Specifically, minimizing the internal spline energy Eint is equivalent to expanding or contracting the closed curve to change it into a smooth curve.

Eimage is an image energy derived by image features such as lines or edges present within the target area. A gray level or an edge strength of the features is used.

Econ is an external constraint force applied to the closed curve and is defined by a force oriented inside a normal of the contour line. It simulates, for example, hydraulic pressure acting on an object submerged in water and works to precisely fit the closed curve to the contour. As described above, the snake is a deformable spline curve whose shape is controlled by the energy derived from an image.

The use of the snakes in lane mark recognition enables a contour to be found autonomously and eliminates the need for binary coding and dot-to-line image processing. This operation, however, is relatively time intensive for a computer. Specifically, each time each contour point of a contour model is moved slightly, the energy of that point must be calculated repeatedly until the energy thereof is minimized, which results in an increase in operation load on the computer. Particularly, the realization of automatic driving of the vehicle requires recognition of rapidly changing lane marks in real-time, thus causing a computer operation load to be increased.

It is, therefore, an object of the invention to provide a lane mark recognition system for vehicles which are capable of recognizing a lane mark at a speed higher than that required for the energy minimizing operation without need for binary coding and dot-to-line image processing.

SUMMARY OF THE INVENTION

It is therefore a principal object of the present invention to avoid the disadvantages of the prior art.

It is another object of the present invention to provide a lane mark recognition apparatus for vehicles which is designed to recognize a lane mark printed on a road accurately using image processing.

According to one aspect of the invention, there is provided a lane mark recognition apparatus for a vehicle which comprises: (a) an image capturing mechanism capturing an image of a road ahead of a controlled vehicle equipped with this apparatus: and (b) a lane mark recognition circuit recognizing a lane mark printed on the road in the image captured by said image capturing mechanism. The lane mark recognition circuit identifies a location in the image at which a string model is converged as a location of the lane mark. The string mode is made up of a plurality of string components and lines connecting adjacent two of the string components and defined to be moved in the image by an attractive force produced based on a measure of a picture property of the lane mark. Each of the connecting lines has a physical property of an elastic member which produces a reactive force against deformation of the string model so as to keep geometry of the whole of the string model.

In the preferred mode of the invention, the measure of the picture property is a brightness per pixel in the image.

The measure of the picture property may alternatively be a chromaticity per pixel in the image.

Each of the string components is allowed to move only in a horizontal direction of the image. The reactive forces produced by the connecting lines are strengthened as approaching a lower end of the image.

The connecting lines have the same physical property. The lengths of the connecting lines are prolonged as approaching the lower end of the image so as to increase the reactive forces for keeping the geometry of the whole of the string model.

The lengths of the connecting lines may be identical with each other. In this case, the connecting lines have elastic moduli which increase as approaching the lower end of the image so as to increase the reactive forces for keeping the geometry of the whole of the string model.

Ranges within which the string components are sensitive to the attractive forces are broadened as approaching a lower end of the image.

The lane mark recognition circuit determines that the string model has been converged at the lane mark in the image if a given condition is met..

The given condition is represented by an evaluation equation in terms of the measure of the picture property of the lane mark.

The given condition may alternatively be represented by an evaluation equation in terms of the attractive force acting on each of the string components.

The lane mark recognition circuit performs a first step of determining a target displacement of each of the string components based on the attractive force acting thereon and a second step of shifting each of the string components by the target displacement. The lane mark recognition circuit determines that the given condition is met when the first and second steps have been performed a given number of times.

According to another aspect of the invention, there is provided a storage medium storing therein signals representing a program which is readable by a computer constituting a lane mark recognition circuit of a lane mark recognition apparatus for a vehicle designed to capture an image of a road ahead of a controlled vehicle equipped with the lane mark recognition apparatus and to recognize a lane mark printed on the road through the lane mark recognition circuit. The lane mark recognition circuit executes the program to identify a location in the image at which a string model is converged as a location of the lane mark. The string mode is made up of a plurality of string components and lines connecting adjacent two of the string components and defined to be moved in the image by an attractive force produced based on a measure of a picture property of the lane mark. Each of the connecting lines has a physical property of an elastic member which produces a reactive force against deformation of the string model so as to keep geometry of the whole of the string model constant.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
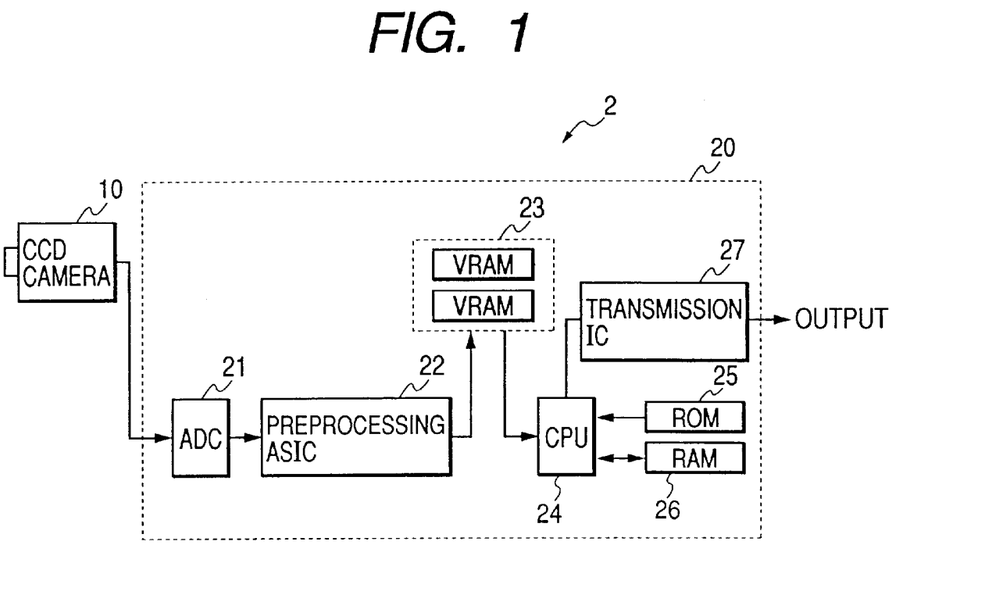
FIG. 1 is a block diagram which shows a lane mark recognition apparatus for a vehicle according to the present invention.

Referring now to the drawings, particularly to FIG. 1, there is shown a lane mark recognition system 2 according to the present invention which is installed in an automotive vehicle to recognize lane marks printed on a road to have a vehicle operator visually perceive a traveling portion of the road in front of the vehicle and which may be employed in automatic cruise control.

Figure 2:
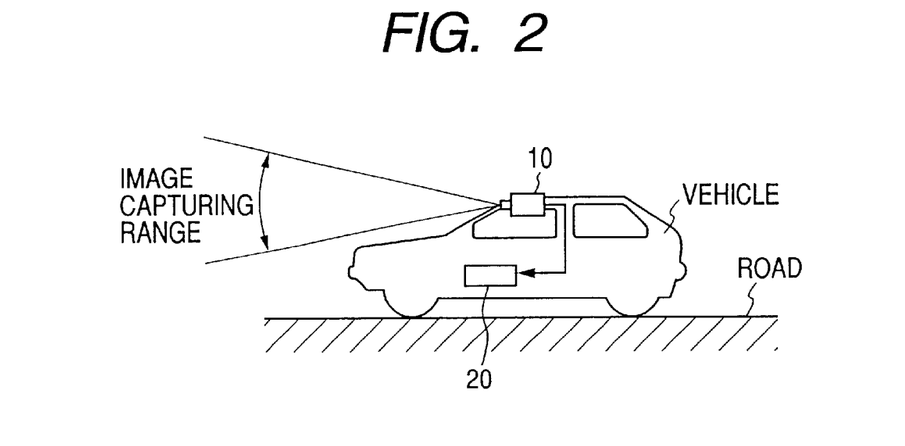
FIG. 2 is an illustration which shows an image capturing range of a CCD camera mounted in a vehicle.

The lane mark recognition system 2 consists essentially of a CCD camera 10 and an image processor 20. The CCD camera 10 is mounted, for example, on the ceiling above a driver's seat in a vehicle cabin and captures an image of a frontal view, as shown in FIG. 2. When the vehicle is traveling on a road, the CCD camera 10 picks up an image including a road surface spaced a given distance ahead of the vehicle.

The image processor 20 includes an A/D converter 21, a preprocessing ASIC (Application Specific Integrated Circuit) 22, an image storage 23, a CPU 24, a ROM 25, a RAM 26, and a transmission IC 27.

The A/D converter 21 converts an analog image signal outputted from the CCD camera 10 into digital image data. The preprocessing ASIC 22 subject the image data from the A/D converter 21 to given processing such as noise filtering, contour-emphasizing which emphasizes an edge, or combination thereof. The image storage 23 stores therein the image data outputted from the ASIC 22. The CPU 24 executes a program, as will be discussed later, installed in the ROM 25 to recognize a lane mark in the image data stored in the image storage 23 logically using the RAM 26. The transmission IC 27 outputs a signal indicative of results of recognition of the lane mark.

The CPU 24 uses a string model in recognition of a lane mark in an image stored in the image storage 23 and identifies a location at which the string model is converged in the image as a location of the lane mark. The string model used in this embodiment will be discussed in detail with reference to FIGS. 3(a) to 3(c).

Figure 3A:
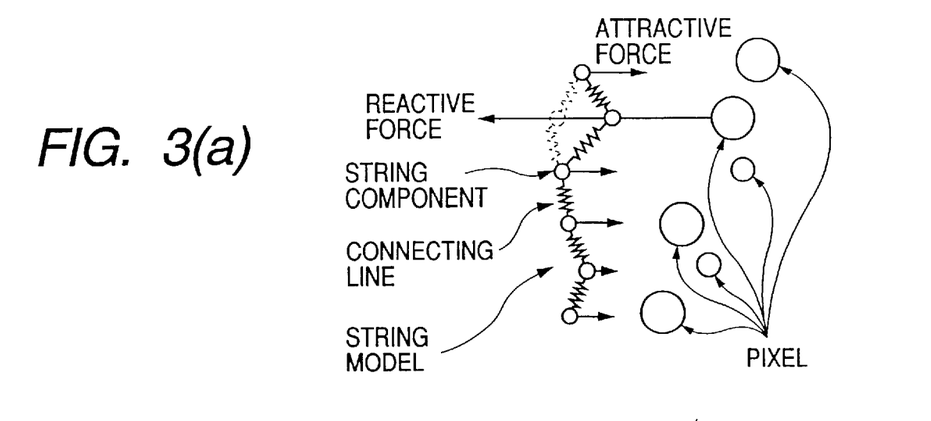
FIG. 3(a) is an illustration which shows a relation between string components of a string model and attractive forces acting on the components.

The string model is made up of a plurality of string components (i.e., dots) and connecting lines each connecting adjacent two of the string components. This embodiment, as shown in FIG. 3(a), defines the string model using six string components and five connecting lines.

Each string component is moved by an attractive force produced depending upon a measure of a picture property of a lane mark in a captured image. This embodiment uses the brightness per pixel of a captured image as the measure of the picture property of a lane mark. Each string component is displaced by the attractive force proportional to the brightness per pixel. In FIG. 3(a), a greater size of each circle represents a higher brightness of a pixel.

Specifically, each string component is moved to a pixel of a captured image which generates a greater attractive force proportional to the brightness thereof, that is, a brighter portion of the image. Usually, lane marks printed on a typical road are made up of white lines and form brighter areas of the road surface. The string components are, therefore, attracted to an area of the image occupied by a neighboring lane mark.

A location of each string component also depends upon a location(s) of an adjacent one(s) connecting through the connecting line(s). This embodiment give each connecting line a physical property of an elastic member which produces a reactive force depending upon a measure of deformation of the connecting line for keeping the shape or geometry of the whole of the string model constant. The following discussion will refer to a spring as an example of the elastic member.

When each string component is, as shown in FIG. 3(a), moved by the attractive force produced by an adjacent pixel, it will cause the connecting line(s) connecting with a neighboring string component(s) to be extended or compressed, thereby producing a restitutive force which acts on the string components as a reactive force against the attractive force to keep the geometry of the whole of the string model constant. Specifically, the location of the whole of the string model is determined by a balance of the attractive force produced proportional to the brightness per pixel acting on each string component and the spring force of each connecting line. This avoids failure in tracing candidate edges for a lane mark in a captured image due to any edges existing near the lane mark. Specifically, if each string component is so defined as to approach only a brighter area of a captured image, it may move toward a bright portion of the image other than a lane mark, but this error is eliminated by determination of the location of the whole of the string model based on a balance of the attractive force produced proportional to the brightness per pixel and the spring force of each connecting line.

Basically, the recognition of a lane mark is achieved by determining a portion of an image at which the string model having the above described properties is converged as a location of the lane mark, but this embodiment further improves it in respect to two points below in order to realizing more accurate recognition of a lane mark.

Figure 5A:
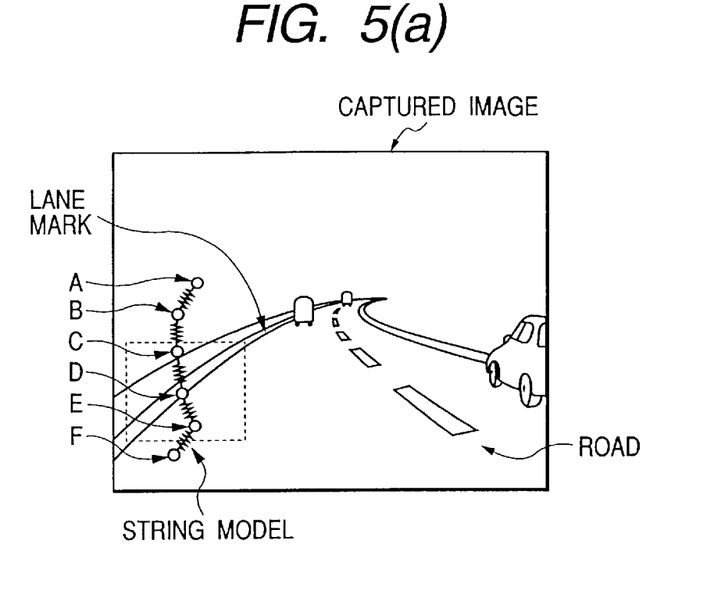
FIG. 5(a) is an illustration which shows the orientation of a string model in a captured image.

The first improvement will be discussed below. The CCD camera 10 is, as already described, mounted on the ceiling of a vehicle cabin. In other words, the CCD camera is placed at up to a height of about two meters. Thus, when a road, as shown in FIG. 5(a), curved at a constant curvature is captured by the CCD camera 10, the curvature of the road in a captured image becomes smaller in a lower portion of the image, that is, in a portion of a frontal view close to the CCD camera 10 (i.e., the vehicle), while it becomes greater in an upper portion of the image, that is, in a portion of the frontal view distant from the CCD camera 10.

The properties of the string model are, therefore, so established that each string component is allowed to move only in a lateral direction of a captured image, and a holding force for holding the geometry of the whole of the string model is produced which increases as approaching a lower portion of the image. Specifically, difficulty of each string component in moving is increased as approaching a lower end of the image. Figuratively speaking, flexibility similar to that of a fishing rod is given to the string model. This keeps the string model free from a change in curvature of a road caused by far and near in an image captured by the CCD camera 10.

In order to provide the above properties to the string mode, the physical properties of all the connecting lines are set identical with each other, and the distance between adjacent two of the string components is increased as approaching the lower end of a captured image. This will be described below in detail with reference to FIG. 3(b).

Figure 3B:
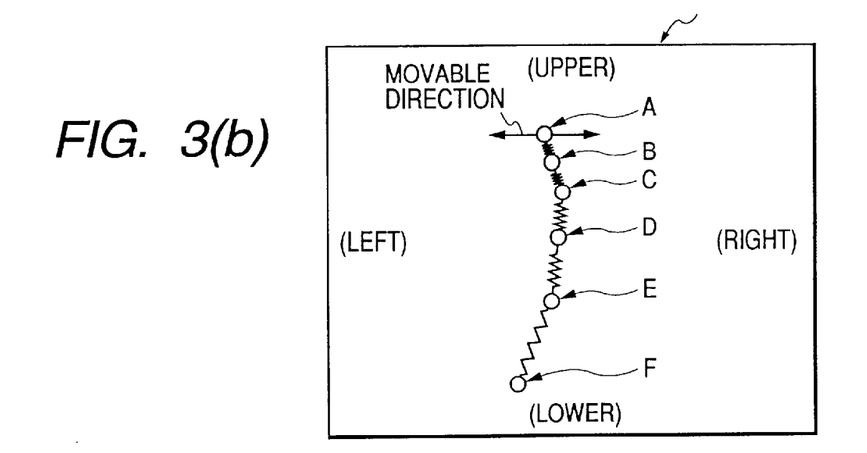
FIG. 3(b) is an illustration which shows a relation in distance between adjacent two of string components in a captured image.

In FIG. 3(b), A, B, C, D, E, and F denote the string components. A denotes the uppermost string component, and F denotes the lowermost string component in the captured image. The distance between the string components A and B is the shortest in the string model, while the distance between the string components E and F is the longest. The springs forming the connecting lines have the same length and the same spring constant, so that the longer the distance between adjacent two of the string components become, the greater the spring pressure acting on the two spring components becomes. The lowermost spring, thus, produces the greatest spring pressure to hold the geometry of the whole of the string model from changing.

The distance between adjacent two of the string components may alternatively be set identical with each other. In this case, the spring constants are increased from the uppermost spring to the lowermost one.

The second improvement will be discussed below.

Figure 3C:
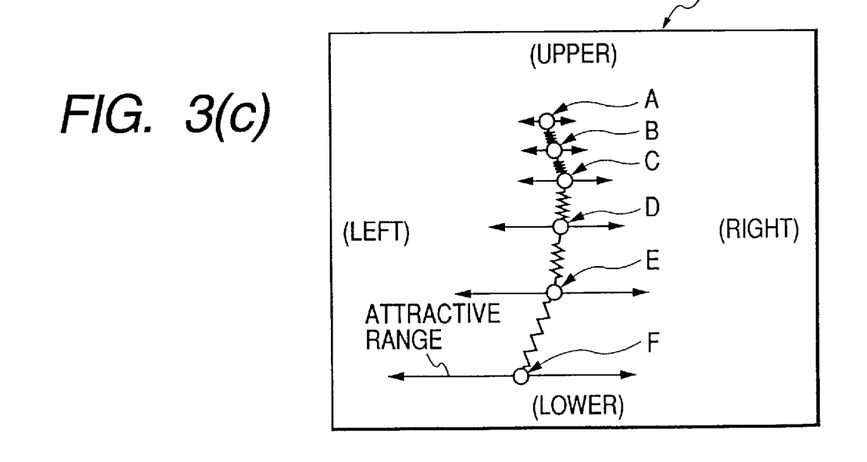
FIG. 3(c) is an illustration which shows a movable range of each string component in a captured image.

Even if the vehicle is traveling on a road having a constant width, the road in an image captured by the CCD camera 10, as shown in FIG. 5(a), increases in width as approaching the lower end of the image (i.e., the CCD camera 10). Therefore, in the properties of the string model, a range within which each string component is sensitive to the attractive force depending upon the brightness per pixel is broadened in a lower portion of the image. Referring to FIG. 3(c), an attractive range within which the lowermost string component F is sensitive to the attractive force produced by the brightness per pixel is the broadest in the string model, while an attractive range within which the uppermost string component A is sensitive to the attractive force is the narrowest in the string model, thereby allowing each string component to be displaced within a proper range in accordance with an actual width of the road.

Figure 4:
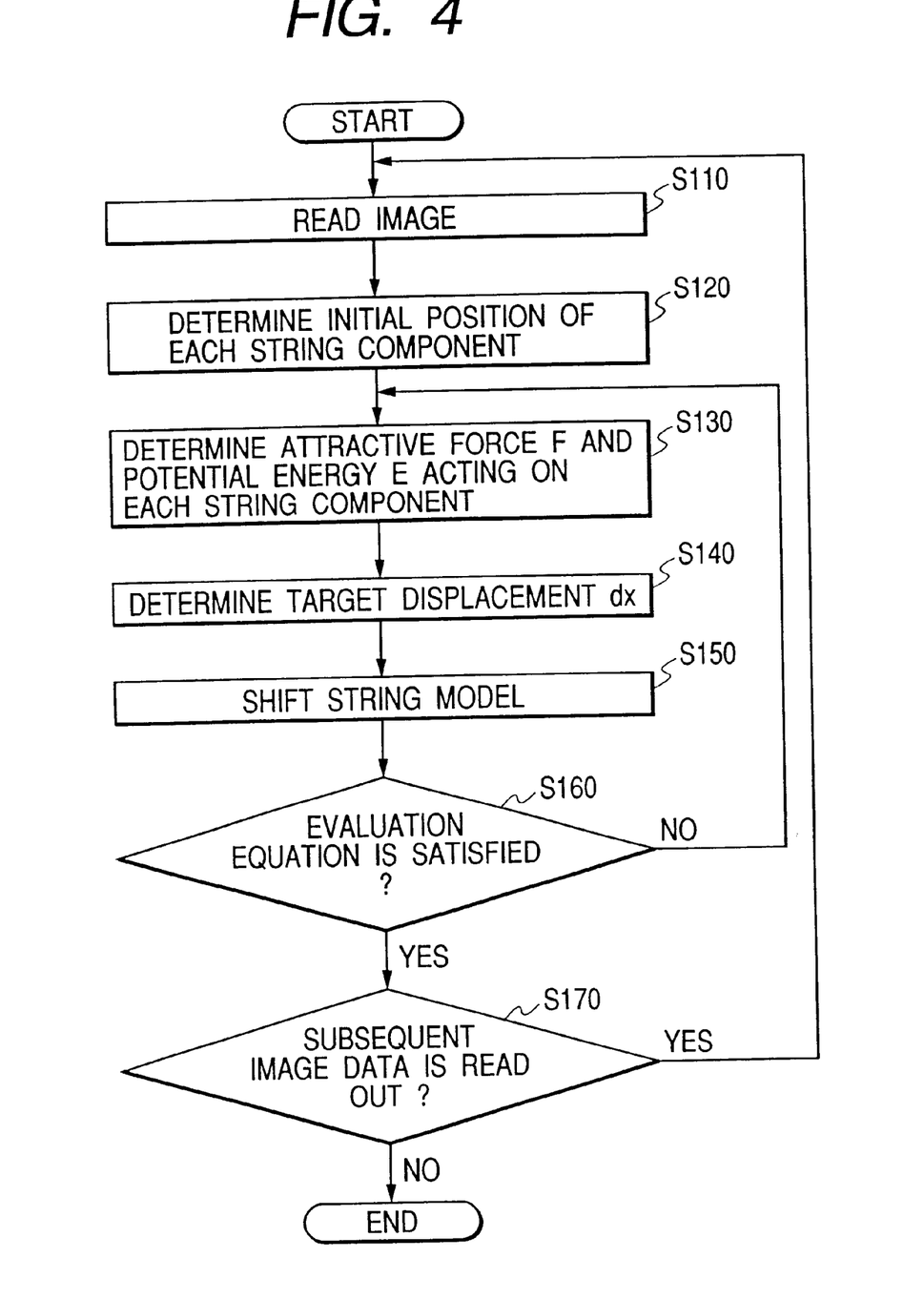
FIG. 4 is a flowchart of a lane mark recognition program performed by the lane mark recognition apparatus in FIG. 1.

FIG. 4 is a flowchart of a program or sequence of logical steps stored in the ROM 25, performed by the CPU 24 to recognize a lane mark printed on a road. This program is executed at regular intervals when an ignition switch (not shown) is turned on and when lane mark recognition requirements are met in another control circuit (not shown).

After entering the program, the routine proceeds to step 110 wherein image data of one frame is read out of the image storage 23 and inputted to the RAM 26.

The routine proceeds to step 120 wherein initial positions of the string components A to F of the string model are determined. The string components A to F are, as described above, allowed to move only in a horizontal direction in the image and arranged from top to bottom in an order of A, B, C, D, E, and F. These conditions remain unchanged until the string model is converged at a lane mark in a captured image. A lane mark in an image captured by the CCD camera 10 is usually located in a particular area of the image. For instance, in a case where a controlled vehicle equipped with the CCD camera 10 is, as shown in FIG. 5(a), traveling on a left lane of a road, a lane mark on the left side of the road extends from a lower left portion to a central portion of an image captured by the CCD camera 10. The location of the lane mark in the image remains unchanged as long as the road extends straight, but if the road is curved right of left, the farthest portion of the road is curved from the central portion to the right of left. Thus, it is advisable that the initial position of each string component be, as shown in FIG. 5(a), defined in a left lower portion of the image for ease of convergence of the string model on the lane mark. For instance, the string model may be defined, as a whole, straight in a vertical direction in the left lower portion of the image, or alternatively diagonally with the uppermost string component A positioned at a central portion of the image and the lowermost string component F positioned at a left lower portion of the image.

The above discussion refers to the case where the controlled vehicle travels on the left lane of a road, but in a case where the vehicle travels on the right lane, it is advisable that the initial location of the string model be determined on the right side of the image. Further, an automatic guided vehicle used, for example, in a factory usually travels on a line (i.e., a lane mark), so that the line is displayed near the center of a captured image. It is, thus, advisable that the initial location of the string model be defined near the center of the whole of the image.

Referring back to FIG. 4, after step 120, the routine proceeds to step 130 wherein factors of attracting each string component to the lane mark in the image are determined in terms of the attractive force F and the potential energy E using the following relations.

F=Σ(pixel brightness/distance having a direction)

E=Σ(pixel brightness/distance having no direction)

The attractive force F and the potential energy E are calculated for each of the string components A to F, but the attractive ranges wherein the string components A to F are sensitive to the attractive forces F are, as described in FIG. 3(c), different from each other. The attractive range of the uppermost string component A is narrower than any other ranges in the string model, while the attractive range of the lowermost string component F is broader than any other ranges in the string model. Therefore, attractive force components are first determined each of which is proportional to one of pixels within the attractive range of each of the string components A to F and then summed to determine the attractive force F in the following manner.

Figure 5B:
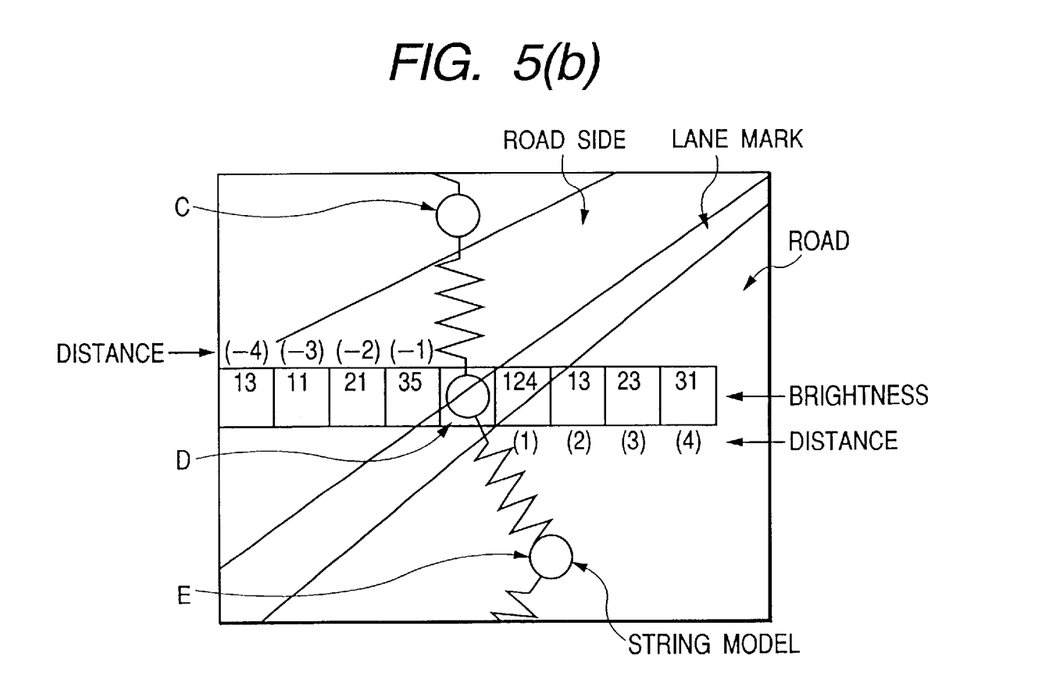
FIG. 5(b) is an enlarged view which shows a portion of the image, as shown in FIG. 5(a), enclosed by a broken line.

A portion of the image, as shown in FIG. 5(a), enclosed by a broken line is illustrated in an enlarged view of FIG. 5(b). The string component D will be referred to as an example. The string component D is movable within a horizontal range from four right pixels to four left pixels across a central pixel in which the string component D is positioned. The right and left directions from the string component D are defined as positive and negative directions, respectively. Each square represents one pixel. A number in each square represents a brightness level of the pixel. Specifically, the four pixels arranged on the right side of the string component D have brightness levels of 124, 13, 23, and 31, and the four pixels arranged on the left side of the string component D have brightness levels of 35, 21, 11, and 13. In this case, the attractive force F is given by the following relation.

$$F = \sum \text{(pixel brightness/distance (having a direction))}$$
$$= [13/(-4)] + [11/(-3)] + [21/(-2)] + [35/(-1)] + [124/1] +$$
$$[13/(2)] + [23/3] + [31/4]$$

The potential energy E has no direction in distance from the string component D and is given by the following relation.

$$E = \sum \text{(pixel brightness/distance (having no direction))}$$
$$= [13/(4)] + [11/(3)] + [21/(2)] + [35/(1)] + [124/1] +$$
$$[13/(2)] + [23/3] + [31/4]$$

After the attractive force F and the potential energy E are determined, the routine proceeds to step 140 wherein a target displacement of dX of each of the string components A to F is determined according to the relation below using the attractive force F and the potential energy E derived in step 130.

$$dX=F/(K\cdot(k\cdot E))$$

Where K is a spring constant, and k is a displacement restraint coefficient. This embodiment has the springs having the same spring constant disposed between the string components A to F, and thus the spring constants k used in determination of the target displacements dX of the string components A to F are identical with each other. The displacement restraint coefficient k is a coefficient for restraining each string component from overshooting depending upon the potential energy E and from hunting.

After step 140, the routine proceeds to step 150 wherein each of the string components A to F is moved by the target displacement dX derived in step 140 to shift the string model as a whole.

The routine proceeds to step 160 wherein it is determined whether a preselected evaluation equation is satisfied or not. If a NO answer is obtained, then the routine returns back to step 130. Alternatively, if a YES answer is obtained, then the routine proceeds to step 170.

The determination in step 160 is made for determining whether the string model is converged at the lane mark or not. For example, an evaluation equation in terms of the attractive force F acting on each of the string components A to F may be used. Specifically, determination of whether the attractive force F exerted on each of the string components A to F after moved by the target displacement dX is near zero (0) or not is made using the so-called energy minimization method.

Another evaluation equation in terms of a measure of a picture property of the lane mark may alternatively be used. For example, determination of whether the brightness of a pixel to which each string component has been moved has a value or not which allows the lane mark to be determined as being located on that pixel may be made. Referring to FIG. 5(b), the brightness of a pixel on the lane mark is 124, while the greatest brightness in other pixels is 35. A pixel having a brightness of, for example, more than 100 may, thus, be considered as being located on the lane mark.

As an alternative to the above determination in step 160, it may be determined whether the displacement of each string component has been performed a given number of times or not, that is, whether steps 130 to 150 have been executed the given number of times or not. This decreases a calculation load of the CPU 24.

If a YES answer is obtained in step 160, then the routine proceeds to step 170 wherein it is determined whether image data of a subsequent frame is to be read out of the image storage 23 or not. If a YES answer is obtained, then the routine returns back to step 110. Alternatively, if a NO answer is obtained, then the routine terminates.

The lane mark recognition system 2 of this embodiment is, as can be seen from the above discussion, designed to determine the location in an image at which the string model is converged as the location of a lane mark. This eliminates the need for the binary-coding and the dot-to-line image processing which are unstable, sensitive to a change in environmental condition.

The present invention, as described above, may be used with automatic guided vehicles usually utilized in a factory. A guide line for guiding the vehicle is not always a bright line printed on a dark floor. For example, a black line may be printed on a white floor. In this case, the attractive force F is determined in inverse proportion to the brightness of a pixel. Further, in a case where a red line is printed on a floor painted blue which has substantially the same brightness as that of the red line, a color image may be picked up by the CCD camera 10 to determine the attractive force F based on the chromaticity. Specifically, the attractive force F is increased as the chromaticity of a pixel reaches that of the red line.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims. For example, the attractive force F and the potential energy E may be determined in step 130 of FIG. 4 using a separate ASIC instead of the CPU 24. The program, as shown in FIG. 4, performed in the CPU 24 may be stored in a portable storage medium such as a floppy disc, an optical disc, a CD-ROM, a DVD, or a hard disc and loaded into the lane mark recognition system implemented with a computer. The program may alternatively be preinstalled in a ROM or a backup RAM built in the lane mark recognition system.

What is claimed is:

1. A lane mark recognition apparatus comprising:
   an image capturing mechanism configured to capture an image of a road having a lane mark portion, the lane mark portion of the captured image of the road having a picture property associated therewith; and
   lane mark recognition means configured to detect the lane mark portion within the image of the road by performing a string model analysis of the image, said string model analysis including automatically moving a string construct within the image to converge on the lane mark portion of the image;
   wherein said string construct is modeled as a series of node-type string elements spaced within the image and a plurality of string segments interconnecting respective adjacent pairs of said node-type string elements, each of said node-type string elements being movable within the image and each of said string segments being modeled as an elastic element resiliently biasing relative movement between said respective adjacent pairs of said node-type string elements; and
   wherein said lane mark recognition means is configured to assign relative attractive forces between said node-type string elements and the lane mark portion of the image based on a measure of the picture property of the image, said lane mark recognition means being further configured such that the node-type string elements of said string construct are converged toward the lane mark portion of the image as a function of said relative attractive forces.

2. An apparatus according to claim 1, wherein the image comprises an arrangement of pixels and wherein said picture property is brightness per pixel of the image.

3. An apparatus according to claim 1, wherein the image comprises an arrangement of pixels and wherein said picture property is chromaticity per pixel of the image.

4. An apparatus according to claim 1, wherein movement of each of said node-type string elements within the image is limited to movement in a horizontal direction with respect to the image, and wherein a resilient biasing force between respective pairs of node-type string elements increases for each consecutive pair of said string elements in a lengthwise direction of said string construct toward a lower portion of the string construct.

5. An apparatus according to claim 4, wherein said string segments of said string construct are defined to have identical coefficients of elasticity, and wherein string segments located closer to the bottom of the image are stretched more than string segments closer to the top of the image.

6. An apparatus according to claim 4, wherein said string segments are all defined to stretch by identical amounts, and wherein said string segments are each defined to have a coefficient of elasticity and the coefficients of elasticity of the string segments increase in the lengthwise direction of said string construct toward the lower portion of the string construct.

7. An apparatus according to claim 1, wherein each of said node-type string elements is defined to have a relative sensitivity to the attractive forces acting thereon, the relative sensitivity of each of said node-type string elements increasing in a lengthwise direction of the string construct toward the lower portion of the string construct.

8. An apparatus according to claim 1, wherein said lane mark recognition means is configured to recognize when said string construct converges with the lane mark portion of the image.

9. An apparatus according to claim 8, wherein said lane mark recognition means is further configured to determine a target picture property measure of the lane mark portion of the image and wherein said string construct is defined to have converged with the lane mark portion of the image when each of the node-type string elements is positioned within a portion of the image having a picture property measure matching said target picture property measure.

10. An apparatus according to claim 8, wherein said lane mark recognition means is configured to determine 1) an overall attractive force magnitude acting between the node-type string elements and the lane mark portion of the image and 2) an overall biasing force magnitude caused by the elasticity of said string segments, and wherein said string construct is defined to have converged with the lane mark portion of the image when said string construct is positioned within the image so that the overall attractive force magnitude acting thereon is equal to the overall biasing force magnitude.

11. An apparatus according to claim 8, wherein said lane mark recognition means is further configured to determine a target displacement for each of said node-type string elements that is proportional to a magnitude of attractive forces acting thereon and subsequently to move each of said node-type string elements within the image by the respective target displacement, and wherein said string construct is defined to have converged with the lane mark portion of the image when a predetermined number of movements of said node-type string elements have been performed by said lane mark recognition means.

12. A storage medium storing therein a program which is readable by a computer, said computer comprising a part of a lane mark recognition means in a lane mark recognition apparatus for a vehicle, said lane mark recognition apparatus being configured to capture an image of a road ahead of a controlled vehicle equipped with the lane mark recognition apparatus and to recognize a lane mark printed on the road via execution of the lane mark recognition program, said lane mark recognition means executing the program to identify the location of the lane mark in the image as being a location to which a string construct converges, the string construct being comprised of a plurality of node-type string elements and string segments connecting adjacent pairs of said string elements, said construct being moved in the image by an attractive force produced based on a measure of a picture property of the lane mark portion of the image, each of the string segments being modeled as an elastic member which produces a reactive force against deformation of the string construct so as to maintain geometry of the whole of the string construct.

* * * * *